(12) United States Patent
Lomet et al.

(10) Patent No.: US 8,930,321 B2
(45) Date of Patent: Jan. 6, 2015

(54) LOGICAL RECOVERY WITH UNBUNDLED TRANSACTION SERVICES

(75) Inventors: David Lomet, Renton, WA (US); Kostas Tzoumas, Athens (GR)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 12/827,941

(22) Filed: Jun. 30, 2010

(65) Prior Publication Data

US 2012/0005168 A1 Jan. 5, 2012

(51) Int. Cl.
G06F 7/00 (2006.01)
G06F 11/14 (2006.01)

(52) U.S. Cl.
CPC .................... G06F 11/1471 (2013.01)
USPC ............ 707/674; 707/672; 707/683; 707/686

(58) Field of Classification Search
CPC .................................................... G06F 11/1471
USPC ................... 707/672, 674, 683, 686
See application file for complete search history.

(56) References Cited

U.S. PATENT DOCUMENTS

| | | | |
|---|---|---|---|
| 4,945,474 A | 7/1990 | Elliott et al. | |
| 5,043,866 A | 8/1991 | Myre et al. | |
| 5,317,731 A * | 5/1994 | Dias et al. .............. | 1/1 |
| 5,440,727 A * | 8/1995 | Bhide et al. ............ | 711/117 |
| 5,845,292 A * | 12/1998 | Bohannon et al. ...... | 1/1 |
| 5,870,763 A * | 2/1999 | Lomet ..................... | 1/1 |
| 5,966,706 A * | 10/1999 | Biliris et al. ............ | 1/1 |
| 6,085,200 A * | 7/2000 | Hill et al. ................ | 1/1 |
| 6,185,699 B1 * | 2/2001 | Haderle et al. ......... | 714/19 |
| 6,978,279 B1 | 12/2005 | Lomet et al. | |
| 7,065,537 B2 | 6/2006 | Cha et al. | |
| 7,305,421 B2 | 12/2007 | Cha et al. | |
| 7,426,559 B2 | 9/2008 | Hamel et al. | |
| 7,472,139 B2 | 12/2008 | Nishikawa et al. | |
| 8,170,997 B2 | 5/2012 | Lomet et al. | |
| 2002/0138446 A1 | 9/2002 | Antonin et al. | |
| 2004/0260726 A1 * | 12/2004 | Hrle et al. .................. | 707/104.1 |

(Continued)

FOREIGN PATENT DOCUMENTS

DE    EP0465018 B1 *  5/1997  ............. G06F 11/14

OTHER PUBLICATIONS

Lomet, D., Persistent Applications Using Generalized Redo Recovery, IEEE, 1998, pp. 154-163.*

(Continued)

*Primary Examiner* — Cheyne D Ly
(74) *Attorney, Agent, or Firm* — Steve Wight; Judy Yee; Micky Minhas

(57) ABSTRACT

This patent application relates to enhanced logical recovery techniques for redo recovery operations of a system with an unbundled storage engine. These techniques can be implemented by utilizing an enhanced logical recovery approach in which a dirty page table (DPT) is constructed based on information logged during normal execution. The unbundled storage engine can include a transaction component (TC) that is architecturally independent of a data component (DC). These techniques can enhance redo recovery operations by mitigating the resources needed to determine whether previously executed operations sent from the TC to the DC are to be repeated in response to a recovery-initiating event. This can include using the DPT to avoid fetching every data page corresponding to every previously executed operation received by the DC during recovery and/or pre-fetching data pages and/or index pages that correspond to PIDs in the DPT.

20 Claims, 5 Drawing Sheets

(56) References Cited

U.S. PATENT DOCUMENTS

| | | | |
|---|---|---|---|
| 2006/0004839 A1* | 1/2006 | Nagasawa et al. | 707/102 |
| 2006/0167960 A1* | 7/2006 | Lomet | 707/206 |
| 2006/0253502 A1 | 11/2006 | Raman et al. | |
| 2007/0011105 A1 | 1/2007 | Benson et al. | |
| 2007/0112885 A1 | 5/2007 | Farr | |
| 2007/0282848 A1 | 12/2007 | Kiilerich et al. | |

OTHER PUBLICATIONS

Lomet et al, Redo Recovery after System Crashes, Proceedsings of the 21st VLDB Conference, Zurich, Switzerland, 1995, pp. 457-468.*

Sears, et al., "Segment-Based Recovery: Write-Ahead Logging Revisited", Retrieved at << http://www.vld.org/pvldb/2/vldb09-583.pdf >>, Proceedings of the VLDB Endowment, vol. 2, No. 1, Aug. 24-28, 2009, pp. 12.

Lomet, et al., "Logical Logging to Extend Recovery to New Domains", Retrieved at << http://www.markrtuttle.com/papers/lt99-sigmod.pdf>>, ACM SIGMOD Record, vol. 28, No. 2, Jun. 1999, pp. 12.

Lomet, et al., "A Theory of Redo Recovery", Retrieved at << www.markrtuttle.com/papers/lt03.ps >>, International Conference on Management of Data, Proceedings of the 2003 ACM SIGMOD international conference on Management of data, Jun. 9-12, 2003, pp. 10.

Lomet, et al., "Unbundling Transaction Services in the Cloud", << http://www-db.cs.wisc.edu/cidr/cidr2009/Paper_53.pdf >>, CIDR, Fourth Biennial Conference on Innovative Data Systems Research, Jan. 4-7, 2009, pp. 1-10.

Lomet, et al., "Locking Key Ranges with Unbundled Transaction Services", Retrieved at << http://www.research.microsoft.com/pubs/81295/Part-Lock.pdf>>, Proceedings of the VLDB Endowment, vol. 2, No. 1, Aug. 24-28, 2009, pp. 12.

"Inside Microsoft SQL Server 2005: The Storage Engine", Retrieved at << http://www.microsoft.com/PRODUCTS/info/product.aspx?view=22&pcid=6bf6f680-9f37-403b-85ba-3fbee8c27f00&type=ovr >>, Retrieved Date: Nov. 9, 2009, pp. 2.

Mohan, et al., "ARIES: A Transaction Recovery Method Supporting Fine-Granularity Locking and Partial Rollbacks Using Write-Ahead Logging", Retrieved at << http://www.cs.berkeley.edu/~brewer/cs262/Aries.pdf >>, ACM Transactions on Database Systems (TODS), vol. 17, No. 1, Mar. 1992, pp. 94-162.

Weikum, et al. "Transactional Information Systems". Morgan Kaufmann, 2002.

Gray, et al. "Transaction Processing: Concepts and Techniques", Morgan Kaufmann, 1993.

Lynch, et al., "Atomic Transactions." Morgan Kaufmann, 1993.

"Building the Customer-Centric Systems Architecture". http://mike2.openmethodology.org/wiki/Building_the_Customer_Centric_Systems_Architecture. last accessed Nov. 17, 2008. 2 pages.

Greenwood, P., et al. "Reference Architecture v3.0". Available at: http://www.aosd-europe.net/deliverables/d103.pdf. Jan. 8, 2008. 49 pages.

Kashyap, Aditya. "File System Extensibility and Reliability Using an in-Kernel Database", published Aug. 29, 2008. Available at: https://web.archive.org/web/20080829010026/http://www.fsl.cs.sunysb.edu/docs/kbdbfs-msthesis/index.html, 16 pages.

Lomet, et al. "Implementing Performance Competitive Logical Recovery", In Proceedings of the VLDB Endowment, Aug. 29-Sep. 3, 2011, Seattle, WA.

Sears, et al. "Stasis: Flexible Transactional Storage", In Proceedings of the OSDI '06: 7th USENIX Symposium on Operating Systems Design and Implementation, Nov. 6-8, 2006, 16 pages.

Barga, et al. "Improving Logging and Recovery Performance in Phoenix/App", In Proceedings of the ICDE Conference 2004, Boston, 2004, pp. 486-497.

Barga, et al. "Recovery Guarantees for Internet Applications", ACM Transactions on Internet Technology 4(3), Aug. 2004, pp. 289-328.

Barga, et al. "Recovery Guarantees for Multi-tier Applications", In Proceedings of The 18th ICDE '02 Conference, San Jose, 2002, 12 pages.

Bernstein, et al. "Implementing Recoverable Requests Using Queues", In Proceedings of SIGMOD Conference 1990, Atlantic City, 1990, pp. 112-122.

Bernstein, et al. "Principles of Transaction Processing", Morgan Kaufmann, 1996.

Weikum, et al., "Multi-Level Recovery." In Proceedings of PODS 1990: 109-123, 1990.

Lomet, et al. "Robust Web Services via Interaction Contracts", In Proceedings of TES Workshop, Toronto, 2004, pp. 1-14.

Lomet, et al. "Persistent Middle Tier Components without Logging", In Proceedings of IDEAS 2005, Montreal, 2005, 10 pages.

Lomet, et al. "MLR: A Recovery Method for Multi-Level Systems." In Proceedings of SIGMOD 1992, San Diego, CA, 1992, 12 pages.

Lomet, et al. "Advanced Recovery Techniques in Practice in Recovery Mechanisms in Database Systems", Prentice Hall PTR 1998.

Agrawal, et al. "Integrated concurrency control and recovery mechanisms: Design and performance evaluation". ACM TODS, 10(4): 529-564, 1985.

Agrawal, et al. The performance of concurrency control and recovery algorithms for transaction-oriented database systems. IEEE Database Eng. Bull., 8(2): 58-67, 1985.

Batory, et al. Genesis: An extensible database management system. IEEE TSE, 14(11):1711-1730, 1988.

Franklin, et al. Crash Recovery in client-server EXODUS. In Proceedings of SIGMOD 1992, pp. 165-174, 1992.

Haas, et al. "Starburst mid-flight: As the dust clears". In Proceedings of IEEE TKDE, 2(1):143-160, 1990.

IEEE TCDE. Bulletin of the TC on Data Engineering. IEEE Computer Society, 1985. Available at: http://sites.computer.org/debull/85JUN-CD.pdf.

Jhingran, et al. "Analysis of recovery in a database system using a write-ahead log protocol." In Proceedings of SiGMOD 1992, pp. 175-184, 1992.

Levandoski, et al. "Deuteronomy: Transaction Support for Cloud Data". In Proceedings of CIDR, Jan. 9-12, 2011, 11 pages.

Mohan, et al. "ARIES/CSA: A Method for Database Recovery in Client-Server Architectures". In Proceedings of SIGMOD 1994, pp. 55-66, 1994.

Salles, et al. "An Evaluation of Checkpoint Recovery for Massively Multiplayer Online Games". In Proceedings of PVLDB 2009, 2(1): 2009, 12 pages.

Brantner, et al. "Building a database on S3". In Proceedings of SIGMOD 2008: 251-264, Jun. 9-12, 2008.

Berenson, et al. "A Critique of ANSI SQL Isolation Levels". In Proceedings of SIGMOD 1995: 1-10, 1995.

Cahill, et al. "Serializable Isolation for Snapshot Databases". In Proceedings of SIGMOD 2008, 2008, 10 pages.

Gray, et al. "The Recovery Manager of the System R Database Manager". In Proceedings of SIGMOD 2008: 729-738, 2008.

Harizopoulos, et al. "The Case for Staged Database Systems". In Proceedings of CIDR 2003.

Harizopoulos, et al. "OLTP Through the Looking Glass, and What We Found There". In Proceedings of SIDMOD 2008, Jun. 9-12, 2008, 12 pages.

Hellerstein, et al. "Architecture of a Database System". Foundations and Trends in Databases 1(2): 141-259, 2007.

Herlihy, et al al. "Linearizability: a Correctness Criterion for Concurrent Objects." ACM TOPLAS 12(3): 463-492, 1990.

Jones, et al. "The Atomic Manifesto: a Story in Four Quarks." SIGMOD Record 34(1): 63-69, Mar. 2005.

Lomet, D.B. "Key Range Locking Strategies for Improved Concurrency." In Proceedings of the 19th VLDB Conference, Dublin, Ireland, 185-194, 1993.

Lomet, D.B., "Concurrency and Recovery for Index Trees." In Proceedings of SIGMOD 2003, 2003, 17 pages.

Mohan, et al., ARIES/IM: An Efficient and High Concurrency Index Management Method Using Write-ahead Logging. SIGMOD 1992: 371-380.

Stonebraker, et al., "One Size Fits All: An Idea Whose Time Has Come and Gone." In Proceedings of ICDE 2005, 2005, 10 pages.

Lomet et al., "Implementing Performance Competitive Logical Recovery", Proceedings of the VLDB Endowment, vol. 4, Issue 7, Apr. 2011, pp. 430-439.

* cited by examiner

LOGICAL RECOVERY WITH UNBUNDLED TRANSACTION SERVICES

BACKGROUND

Recovery is a critical aspect of a database management system (DBMS). However, DBMS recovery operations can require significant resources. Various traditional recovery approaches, such as Algorithms for Recovery and Isolation Exploiting Semantics (ARIES) approaches and ARIES-like approaches, have been utilized to mitigate the resources necessary for conducting recovery operations. However, as DBMS characteristics (e.g., architectures) continue to develop and change, implementing these traditional recovery approaches may become infeasible.

SUMMARY

Enhanced logical recovery techniques are described for redo recovery operations of a system, such as a DBMS, with an unbundled storage engine. The unbundled storage engine can include a transaction component (TC) that is architecturally independent of a data component (DC). The TC can be responsible for handling logical transactions while the DC can be responsible for handling system transactions associated with data services. The TC need not convey any information about the logical transactions to the DC. Instead, during normal, non-recovery system operation, the TC can send individual operations to the DC to be executed by the DC atomically.

In some embodiments, the described logical recovery techniques can be implemented by utilizing an enhanced logical recovery approach. More particularly, operations that were previously sent by the TC to the DC prior to recovery can be re-sent by the TC to the DC as redo operations. These operations may have been previously executed by the DC during normal, non-recovery, system operations. Individual operations and redo operations may be associated with corresponding data pages that are to be updated as a result of the DC executing the individual operations and redo operations. The individual operations and redo operations need not include information (e.g., page identifiers (PIDs)) identifying the corresponding data pages. Instead, in some embodiments the individual operations and redo operations may identify logical records that are stored on the corresponding data pages.

The DC can then determine whether each of the redo operations received from the TC are to be repeated (i.e., re-executed). Typically, a redo operation is to be repeated when a corresponding data page was previously updated by the redo operation to become dirty, i.e., after being updated, the corresponding data page would differ from the form of the page on the disk, but the corresponding data page had not yet been written to disk in its updated form to become clean prior to a recovery-initiating event (e.g. a system crash).

To mitigate the resources necessary to determine whether redo operations are to be repeated during recovery, the DC can periodically save delta records in a DC log prior to recovery. The DC can accomplish this without having any knowledge of the logical transactions handled by the TC. Instead, the delta records can be based on data pages updated and corresponding to disk writing events. A delta record can contain lists of PIDs for (1) data pages made dirty and (2) data pages made clean in an interval since a prior delta record was written.

The DC can utilize the saved delta records to construct a dirty page table (DPT) in response to the recovery-initiating event occurring. The DC can then utilize the DPT to avoid fetching from the stable database (i.e., loading) every data page corresponding to every received redo operation (presented to the DC by the TC during recovery) into the DC's cache to determine which data page(s) were dirty and which were clean at the time of a recovery-initiating event.

For example, based on the DPT, the DC can determine that one or more redo operations are not to be repeated without having to fetch any corresponding data pages. Stated another way, the DC can utilize the constructed DPT to filter out, or prune, at least some redo operations that are not to be repeated without performing any data page fetching operations. As a result, only redo operations whose corresponding data pages are in the DPT result in the fetching of their corresponding data pages to determine whether or not they were actually dirty at the time of a recovery-initiating event.

In some embodiments, the resources and/or time associated with the fetching of non-pruned data pages corresponding to redo operations can be mitigated. For example, data pages and/or index pages that correspond to the PIDs in the DPT can be pre-fetched from the database. As a result, the performance of recovery operations can be further improved.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements.

DETAILED DESCRIPTION

Overview

Figure 1:
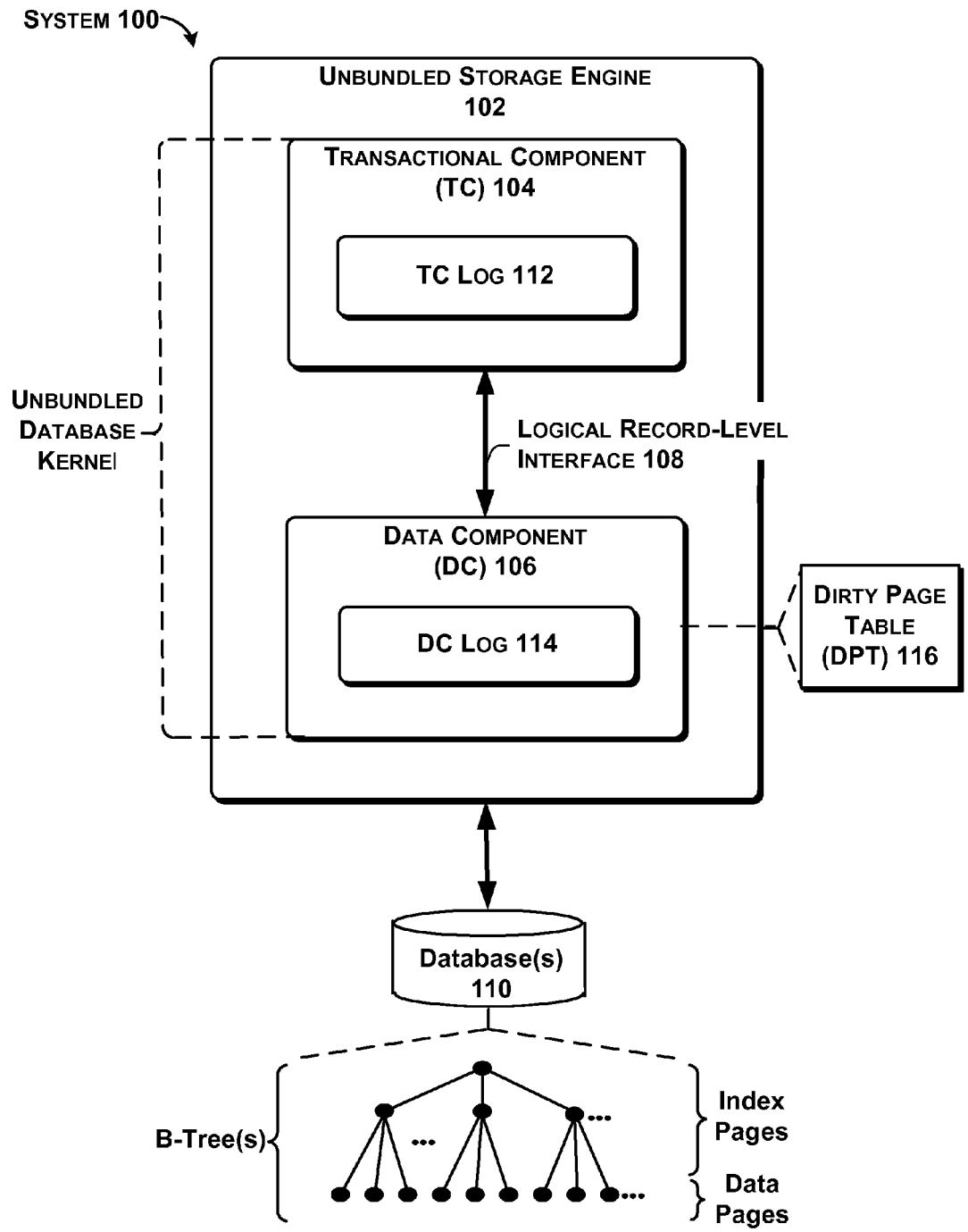
FIG. 1 illustrates an example system in which the described enhanced logical recovery techniques can be implemented, in accordance with some embodiments.

Enhanced logical recovery techniques are described for redo recovery operations of a system, such as a DBMS, with an unbundled storage engine. The unbundled storage engine can include a transaction component (TC) that is architecturally independent of a data component (DC). The TC can be responsible for handling logical transactions (e.g., record-oriented transactions associated with data values and key values and not associated with data services such as data page placement, data page mapping, data page splits, etc.). The DC, in turn, can be responsible for handling system transactions associated with data services such as database access (e.g., data page placement, mapping, data page splits, and other index organizing, etc.) and cache management in the DC's role of supporting data storage and access. The TC need not convey any information about the logical transactions to the DC. Instead, during normal, non-recovery system operation, the TC can send individual operations to the DC to be executed by the DC atomically.

In some embodiments, the described logical recovery techniques can be implemented by utilizing an enhanced logical recovery approach. More particularly, operations that were previously sent by the TC to the DC prior to recovery can be re-sent by the TC to the DC as redo operations. These operations may have been previously executed by the DC during normal, non-recovery, system operations. Individual operations and redo operations may be associated with corresponding data pages that are to be updated as a result of the DC executing the individual operations and redo operations. The individual operations and redo operations need not include information (e.g., page identifiers (PIDs)) identifying the corresponding data pages. Instead, in some embodiments the individual operations and redo operations may identify logical records that can be mapped to the corresponding data pages via a mapping known only to the DC. More particularly, a logical record, when updated, may be stored on a corresponding data page.

The DC can then determine whether each of the redo operations received from the TC are to be repeated (i.e., re-executed). Typically, a redo operation is to be re-executed when its corresponding data page was previously updated (i.e., "dirtied") by the operation to become dirty, but had not yet been written to disk (i.e., "cleaned") in its updated form to become clean prior to a recovery-initiating event (e.g., a system crash). The corresponding data page may have been updated by the redo operation when the redo operation was previously executed (as an operation) by the DC. In other words, typically a redo operation is to be repeated when the redo operation's effects (e.g., update(s)) on the corresponding data page have not been written to disk—thus leaving the corresponding data page dirty at the time of the recovery-initiating event.

To mitigate the resources necessary to determine whether redo operations are to be repeated during recovery, the DC can periodically save delta records in a DC log prior to recovery, during normal system operations. The DC can accomplish this without having any knowledge of the logical transactions handled by the TC. Instead, the delta records can be based solely on pages updated and written to disk by the DC. A delta record can contain lists of PIDs for (1) data pages made dirty and (2) data pages made clean in an interval since a prior delta record was written.

The DC can utilize the saved delta records to construct a dirty page table (DPT) in response to the recovery-initiating event occurring. The DC can then utilize the DPT to avoid fetching (i.e., loading)—from the stable database into the DC's cache—every data page corresponding to every received redo operation presented to the DC by the TC during recovery to determine which data page(s) were dirty and which were clean at the time of a recovery-initiating event.

For example, based on the DPT and without having to fetch any corresponding data pages, the DC can determine that one or more redo operations are not to be repeated. Stated another way, the DC can utilize the constructed DPT to filter out, or prune, at least some redo operations that are not to be repeated without performing any data page fetching operations. As a result, only data pages that correspond to redo operations that have not been pruned (i.e., non-pruned redo operations) need to be fetched to determine whether or not they are dirty or clean.

In some embodiments, the resources and/or time associated with the fetching of data pages corresponding to non-pruned redo operations can be mitigated. For example, data pages and/or index pages that correspond to PIDs in the DPT can be pre-fetched from the database. As a result, the performance of redo recovery can be further improved.

Multiple and varied implementations are described below. Generally, any of the features/functions described with reference to the figures can be implemented using software, hardware, firmware (e.g., fixed logic circuitry), manual processing, or any combination thereof.

The term, "module" or "component" as used herein generally represents software, hardware, firmware, or any combination thereof. For instance, the term "module" or "component" can represent software code and/or other types of instructions that perform specified tasks when executed on a computing device or devices.

Generally, the illustrated separation of modules, components, and functionality into distinct units may reflect an actual physical grouping and allocation of such software, firmware, and/or hardware. Alternatively or additionally, this illustrated separation can correspond to a conceptual allocation of different tasks to the software, firmware, and/or hardware. Furthermore, it is to be appreciated and understood that the illustrated modules, components, and functionality described herein can be located at a single site (e.g., as implemented by a computing device), or can be distributed over multiple locations (e.g., as implemented over multiple computing devices).

Example System

To assist the reader in understanding the described enhanced logical recovery techniques, FIG. 1 illustrates an example system 100 in which these techniques can be implemented. In some embodiments, all or part of the system 100 may comprise a DBMS. In this example, system 100 can include an architecturally partitioned, or unbundled, storage engine 102 that includes a TC 104 that is architecturally independent of a DC 106. Traditionally, logical transactions and system transactions in integrated, or bundled, storage engines are handled in an integrated and dependent manner. In contrast, logical transactions and system transactions in the unbundled storage engine 102 can be handled independently from one another, or autonomously. In the context of a DBMS kernel, unbundled storage engine 102 may thus be thought of as consisting of an unbundled database kernel.

In operation, the TC 104 can autonomously provide transactional services, while the DC 106 can autonomously provide data services. Transactional services may be user-invoked logical transactions, including operations on logical records. In response to record operation executions, the DC may perform system transactions that change data page placement via mapping changes that result from data page splits and other index organizing, etc. By architecturally separating the TC 104 from the DC 106 to create the unbundled storage engine 102, data storage access methods can be implemented in the DC 106 without the added complexity of dealing with logical transactions, which can be handled separately by the TC 104. The TC 104 can deal with logical locking and logging. In other words, the TC 104 need not know anything about the way data pages are stored in one or more databases 110. Thus, the TC 104 need not convey any information about the logical transactions to the DC 106. Instead, the TC 104 can send individual operations and/or redo operations to the DC to be executed by the DC atomically. In this regard, a logical record-level interface 108 can allow communication between the TC 104 and the DC 106.

As will be appreciated and understood by those skilled in the art, to facilitate fetching data pages and other activities associated with locating and accessing data in data pages of database(s) 110, the data pages can be stored in various types of suitable data structures. In some embodiments, a suitable type of data structure(s) can be one or more B-trees. Accordingly, for purposes of illustration, in this example the database(s) 110 is configured to store individual data pages and corresponding individual index pages in one or more B-trees.

Generally speaking, index pages can facilitate or speed up the unbundled storage engine 102 accessing data pages. For example, a user-invoked logical transaction that includes an operation to modify a particular logical record may be received by the DC 106 from the TC 104 via the logical record-level interface 108. The particular logical record may correspond to a particular data page stored in database(s) 110. The DC 106 may utilize a particular index page(s) prior to and/or during the execution of the operation to facilitate locating the particular data page to be updated.

In some embodiments, the TC 104 can be configured to implement the transactional services mentioned above, including TC-related recovery operations, concurrency control, and the like. Similarly, the DC 106 can be configured to implement the data services mentioned above, including DC-related recovery operations, concurrency control, and the like, in support of its normal database storage and access to data. In the context of logical recovery operations, in some embodiments the TC 104 and DC 106 can be configured to implement a logical recovery approach, as discussed below in further detail.

Logical Recovery

As noted above, in some embodiments the enhanced logical recovery techniques described above can be implemented by the system 100 (e.g., a DBMS) by utilizing a logical recovery approach. However, unlike traditional ARIES or traditional ARIES-like recovery approaches (e.g., SQL SERVER's™ multi-level recovery), logical redo recovery operations can be separated into TC logical redo operations (i.e., of a TC redo pass) and DC recovery operations (i.e., of a DC redo and undo passes). The DC redo operations, along with DC undo operations and DC log examination, can be performed by the DC generally as part of DC recovery. The TC logical redo operations of the TC redo pass, in turn, can then be performed by having the TC 104 submit redo operations on a TC log 112 to the DC 106.

To facilitate the reader's understanding of the described techniques, first consider normal, non-recovery, operations that may be performed in the context of system 100. More particularly, as part of the above-mentioned transactional services, the TC 104 can send logical operations (i.e., operations) to the DC 106 via the logical record-level interface 108.

The TC 104 can also TC log information about sent operations and their transactions in the TC log 112. For each operation sent, this information may include (e.g., identify) a corresponding log sequence number (LSN) for the operation (i.e. operation LSN or oLSN) and a record key to identify the logical record to be operated upon (e.g., updated) by the operation.

In addition, in at least some embodiments, the TC 104 can periodically write checkpoints in the TC log 112 as well. A pair of consecutive checkpoints may define an interval that may include one or more logged logical transactions, each logical transaction being associated with one or more operations.

For each pair of checkpoints, the first checkpoint (i.e., the earlier written checkpoint of the checkpoint pair) may be referred to as the penultimate checkpoint for that checkpoint pair. The most recent penultimate checkpoint, which for ease of discussion will be referred to hereafter as the penultimate checkpoint, may identify a start point for recovery operations of the system 100. For purposes of discussion, this start point will be referred to as the redo scan start point (RSSP). Data pages updated (by the DC's execution of an operation) prior to the RSSP have had those updates captured in the stable (e.g., crash survivable) disk storage of the DC of the 106. Stated another way, updates to data pages made prior to the RSSP have been made stable by being written to the disk. As will be appreciated and understood by those skilled in the art, such a penultimate checkpointing scheme might be employed in a DBMS such as Microsoft's SQL SERVER™ for example.

A penultimate checkpointing scheme is one type of scheme in which a redo scan start point for redo recovery can be identified. Therefore, for discussion purposes, the enhanced logical recovery techniques are described in the context of such a scheme. However, it is to be appreciated and understood that the enhanced logical recovery techniques can be implemented in any suitable type of scheme that allows for a start point, such as the RSSP, to be identified.

In embodiments employing such a penultimate checkpointing scheme, the effects of operations logged before the penultimate checkpoint have resulted in data page modifications that have been written to disc, and thus are stable. Thus, the portion of the TC log 112 preceding the penultimate checkpoint can be truncated, and operations logged before this point do not need to be redone as it is known that the effects of these operations are already stable.

However, in such embodiments, it is not known whether the effects of operations logged after (i.e., later than) the penultimate checkpoint have been made stable by being written to disk. As such, it is possible that that some or all of these operations have resulted in modifications to the corresponding data pages that have not been written to disk.

Therefore, for a current interval defined by the penultimate checkpoint and a subsequent checkpoint, there is no guarantee that operations written to the TC log 112 during that current interval have been written to disk. Thus, the penultimate checkpoint can represent, and thus identify, the RSSP from which redo recovery is to proceed in response to the recovery-initiating event. In response to the recovery-initiating event, the TC 104 can send redo operations to the DC 106 for each of the operations in the TC log 112 from the RSSP on. In this regard, the redo operations may be sent to the DC 106 in the same order that the redo operations' corresponding operations were written and stored in the TC log 112, and thus previously sent to the DC 106. In other words, the TC 104 can send redo operations on the log later than the RSSP, in sequence, to the DC 106.

As part of the above-mentioned data services the DC 106, in turn, can receive the redo operations in the order that the corresponding operations were saved in the TC log 112 and previously received from the TC 104. In some embodiments, the TC may be obligated to not send logically conflicting operations concurrently to the DC 106. In this way, the order of records written by the TC 104 in the TC log 112 can be serializably consistent with operations executed by the DC 106. The DC 106 can also receive TC log information about the penultimate checkpoint, and thus RSSP.

In response to receiving the operations and TC log information during normal execution, the DC 106 can also perform system transactions. For example, each of the received operations can be atomically executed by the DC 106. As a result, data pages in the database(s) 110 that correspond to logical records of the logical operations may be updated, and thus dirtied.

In some circumstances the updated version of one or more of the data pages (i.e., the dirty data pages) may then subsequently be cleaned (to become a clean data page(s)) when the updated versions are written to disk. Furthermore, in some circumstances, one or more of the clean data pages may again be updated by another operation to become dirty again.

In addition, the DC 106 can monitor those data pages made dirty and those data pages made clean during performance of normal DC system activity, including the execution of the received operations. The DC 106 can then write information associated with the executed operations (e.g., about the monitored data pages) in a DC log 114. More particularly, two growing arrays can be kept in the DC log 114: a dirtied page array for tracking (i.e., identifying) individual data pages made dirty, and a flushed page array for tracking individual data pages made clean.

Further still, in some embodiments the DC 106 can periodically write delta records in the DC log 114. Each written delta record can include the data pages dirtied and/or cleaned (i.e. flushed) during an interval starting from the preceding written delta record. In other words, each pair of consecutive delta records can define an interval during which individual data pages were cleaned and/or dirtied. The latter delta record of the interval can thus include the data pages that were dirtied and/or cleaned during that interval.

Recall that it is not known whether or not the effects of operations of logical transactions logged in the TC log 112 after the penultimate checkpoint (and thus after the RSSP) have been made stable. Therefore, TC log operations written after the RSSP may not have been made stable, and may thus be in need of recovery.

Therefore, in the context of monitoring for data pages that have been dirtied, only information for data pages updated (e.g., cleaned and/or dirtied) after the penultimate checkpoint was written in the TC log 112 (i.e., after the RSSP) need be maintained in the DC log's two arrays. Thus, only delta records that include information for data pages updated after the penultimate checkpoint need be maintained in the DC log 114. Delta records that include information for data pages updated before the penultimate checkpoint can thus be purged from the DC log 114.

Having considered the actions that occur during normal system operation, now consider enhanced ARIES-like recovery related operations that may be performed in response to the recovery-initiating event. More particularly, in addition to being configured to send normal operations, the DC 106 can also be configured to perform TC logical redo operations of the TC redo pass. Performing TC logical redo operations can include sending redo operations from the TC 104 to the DC 106 via the logical record-level interface 108. As explained above, a redo operation is a previously executed operation which may need to be re-executed during recovery. Furthermore, since the TC 104 can log information about sent operations, each sent redo operation can be accompanied by TC log information identifying a corresponding oLSN for the redo operation (the same oLSN used to identify the operation during normal execution) and a record key for a logical record to be updated by the redo operation.

As will be explained in further detail below, the DC 106 can also perform TC logical redo operations during the TC redo pass. Performing these TC logical redo operations can include determining whether individual received redo operations need to be re-executed based on whether or not individual corresponding data page(s) are dirty or not.

In some embodiments, for a logical recovery approach to be implemented, DC recovery operations can be performed before the TC logical redo operations of the TC redo pass are performed. These DC recovery operations can include redo operation and undo operations for system transactions. More particularly, the DC 106 can perform redo and undo operations for system transactions logged in the DC log 114.

As will be understood and appreciated by those skilled in the art, by virtue of the redo and undo operations being performed before the TC logical redo operations are performed, the B-tree index pages and data pages of the database(s) 110 can be made well-formed. In other words, the B-tree index pages and data pages can be restored to a state structurally equivalent to their state at the time of the recovery-initiating event. As a result, the TC logical redo operations can be performed correctly.

The DC recovery operations can also include DC analysis. More particularly, the DC 106 can also be configured to utilize the information stored in the DC log's delta records to construct a DPT 116. As explained, the DPT 116 can contain entries that list page identifiers (PIDs) of data pages that may be dirty pages as of the time of the recovery-initiating event. Therefore, the DPT 116 can be thought of as a conservative approximation of those data pages that are actually dirty.

In addition to containing a PID of a data page that may be dirty, each entry of the DPT 116 can also contain two corresponding log sequence numbers (LSNs) for the PID: a last LSN (LastLSN) and a recovery LSN (rLSN). The LastLSN may be assigned to the PID by the DC 106 during the DPT's construction and represent the last operation that resulted in the data page's modification. The rLSN may also be assigned to the data page by the DC 106 during the DPT's construction and can be a conservative approximation of the LSN of the first operation likely (conservatively) responsible for dirtying the data page.

The DC 106 can then determine whether individual received redo operations need to be repeated. More particularly, the DC 106 need not consider every received redo operation by fetching each data page corresponding to each received redo operation from the database(s) 110 to determine whether or not that data page is actually dirty. Instead, the DC 106 can prune at least some of the received redo operations from being considered in such a manner. In other words, as discussed in further detail below, the DC 106 can perform pruning operations which may result in one or more received redo operations being identified as corresponding to data pages that do not need to be fetched.

Fetching a data page may include looking up the data page and reading the data page into the cache of the DC 106 in order to compare the data page's LSN (pLSN) to an oLSN of a particular received redo operation. The DC's cache can be a component (e.g., memory) that is available to the DC 106 for storing and/or retrieving data. The pLSN, which can be assigned to the data page by the DC 106, can correspond to the oLSN of the last operation having effects on the data page that were captured in the stable version of the data page when it was last written to disk. In other words, the data page's pLSN can represent the oLSN associated with the most recent stable update to that data page.

By comparing the pLSN to the oLSN of the received redo operation, the DC 106 can determine whether or not the pLSN is greater than the received redo operation's oLSN. If the pLSN is greater or equal, then the effects of the received redo operation have already been captured and made stable and the redo operation hence does not need to be re-executed. This is because the effects of an operation with an oLSN greater or equal to the received redo operation's oLSN have already been written to disk, and thus made stable in the data page. However, if the pLSN is less than the oLSN, then the effects of the received redo operation with the oLSN have not been made stable and the received redo operation needs to be re-executed.

In at least some embodiments, the DC 106 can perform the pruning operations on a received redo operation by first determining whether or not the DPT 116 contains a PID for a data page to be updated by the received redo operation. When the DPT 116 does not contain the PID, the DC 106 can prune the received redo operation. In other words, when the PID is not in the DPT 120, the received redo operation does not need to be re-executed. This is because the effects of the received redo operation, when originally executed, have already been made stable—thus rendering the PID's corresponding data page clean with respect to the received redo operation. Thus, a redo operation for the received redo operation does not need to be performed for a successful recovery.

When the DPT 116 does contain the PID, the received redo operation may still be pruned when the PID's assigned rLSN is greater than the redo operation's corresponding oLSN. This is because when the PID's assigned rLSN is greater than the oLSN, such earlier operations than the operation denoted by the rLSN have their effects on the PID's data page that has been written to disk, and thus made stable. Therefore, the effects of the received redo operation, when previously executed, have also been made stable. Thus a redo operation for the received redo operation does not need to be performed for a successful recovery.

However, when the DPT 116 contains the PID and the PID's assigned rLSN is not greater than the redo operation's corresponding oLSN, the received redo operation cannot be pruned because it is not known whether or not the PID's stable data page has captured the effect of the operation. In other words, without actually fetching the PID's data page to discover the pLSN of the PID's data page, the DC is unable to determine whether or not the effects of the received redo operation (on the PID's data page) have been made stable.

For data pages that correspond to received redo operations that have not been pruned, in some embodiments the time and resources associated with fetching these corresponding data pages can still be mitigated. More particularly, the DC 106 can be configured to pre-fetch (e.g., pre-load) index pages of the B-tree(s) into the DC's cache during (e.g., at the beginning of) the DC recovery operations.

Alternatively or additionally, the DC 106 can be configured to pre-fetch data pages according to a log-driven strategy and/or a DPT-driven strategy. For example, in some embodiments a pre-fetch list can be constructed using the DC log 114 as part of the DC log analysis. Data pages corresponding to the PIDs in the pre-fetch list can be pre-fetched into the DC's cache rather than the DC 106 waiting to load some or all of the data pages (when their corresponding received redo operations are not pruned).

As another example, in some embodiments individual data pages corresponding to PIDs in the DPT 116 can be pre-loaded into the DC's cache in an order based on the PIDs' respective rLSNs.

To assist the reader in understanding the functionality provided by the DC 106 with respect to the DC recovery operations, a more detailed description of each of the following topics is provided below: the DC's role in enhanced logical recovery, non-enhanced logical recovery, delta records in enhanced logical recovery, DPT construction in enhanced logical recovery, logical redo operations using the DPT 116 in enhanced logical recovery, and pre-fetching in enhanced logical recovery.

DC's Role in Enhanced Logical Recovery

As explained above, unlike traditional ARIES or traditional ARIES-like recovery approaches, logical recovery operations can be separated into TC logical redo operations (of the TC redo pass) and DC recovery operations (including DC redo and undo operations). The DC recovery operations can be performed by the DC 106 before the TC logical redo operations of the TC redo pass are performed by both the TC 104 and the DC 106.

By utilizing the enhanced logical recovery techniques described herein, the logical recovery operations can be performed without requiring an impractical commitment of resources, which would likely result in a performance disaster with respect to the system 100. More particularly and as explained above, the DC 106 can maintain the DC log 114 which can be used to construct the DPT 116 in response to a recovery-initiating event. The DC 106 can then utilize the DPT 116 during the TC redo pass to prune at least some received redo operations rather than fetching each and every data page (corresponding to each received redo operation) to determine whether or not each redo operation should be repeated.

In addition, the DC 106 can also pre-fetch index pages and/or data pages during the TC redo pass. As a result, logical recovery operations can be performed without requiring an impractical commitment of resources—thus resulting in an acceptable logical recovery performance.

Non Enhanced Logical Recovery

To illustrate the benefit provided by the described techniques, consider a non-enhanced, or basic, logical recovery approach that might otherwise be taken in order to perform logical recovery. Since such a basic approach would not include maintaining a DC log or constructing a DPT, received redo operations would likely not be pruned. Therefore, each data page corresponding to each received redo operation would be fetched in order to determine whether or not that data page is actually dirty. While this might result in an accurate recovery, such an approach would also likely result in disastrous recovery performance due to the resources expended for each fetching operation. Such a basic logical recovery approach is illustrated, for example, in the algorithm below entitled ALGORITHM 1: BASIC LOGICAL REDO:

---

Algorithm 1: ALGORITHM 1: BASIC LOGICAL REDO

```
1: procedure TC-BASIC-LOGICAL-REDO-PASS(startLSN)
2:   for ∀ logRec with logRec.LSN ≥ startLSN do
3:     DC-BASIC-LOGICAL-REDO-OPERATION(logRec)
4:
5: procedure DC-BASIC-LOGICAL-REDO-OPERATION(logRec)
6:   currLSN = logRec.LSN
7:   Traverse the index to find the PID referred to by logRec
8:   Bring the page p withPID into memory
9:   if currLSN ≤ p.pLSN then
10:     return
11:  else
12:     Redo the operation
```

---

As ALGORITHM 1: BASIC LOGICAL REDO illustrates, during a basic logical recovery, the TC 104 might submit redo operations to the DC 106. An individual redo operation may need to be repeated when the received redo operation's effects on a data page have not already been written to disk before a recovery-initiated effect.

Responsive to receiving a redo operation, the DC 106 might search the B-tree index(es) of database(s) 110 using a record key received with the redo operation. The DC 106 might then fetch a data page corresponding to the record key into the DC's cache—if the data page is not already present in the DC's cache. The DC 106 might then compare the data page's pLSN to the redo operation's LSN (e.g., line 9 of ALGORITHM 1: BASIC LOGICAL REDO) to decide whether or not to repeat the redo operation. Since with this basic logical recovery approach fetching and comparing is repeated for every redo operation received by the DC 106, an unacceptable amount of processing (e.g., unacceptable number of fetches) will likely be required, thus likely resulting in a performance disaster.

Delta Records in Enhanced Logical Recovery

Conceptually, the DPT 116 contains the page ids (PIDs) of what can be considered an approximation of the data pages that are dirty at the time of a recovery-initiating event. As described above, the DPT 116 can be utilized by the DC 106 during the TC redo pass to prune at least some received redo operations.

To construct the DPT 116 in response to the recovery-initiating event, the DC 106 can utilize delta records in the DC log 114. The DC 106 can then utilize the DPT 116 during the TC redo pass to prune at least some received redo operations rather than fetching each data page of every received redo operation to determine whether or not each redo operation should be repeated.

Recall that two growing arrays can be kept in the DC log 114: the dirtied page array tracking individual data pages made dirty, and the flushed page array tracking individual data pages made clean. As explained above, each pair of consecutive (i.e., consecutively written) delta records in the DC log 114 may define an interval that may include the two arrays of dirtied and/or cleaned data pages for that interval.

In some embodiments, when an update (i.e., the effects of an operation) to a data page occurs, the PID of the updated data page can be added in the dirtied page array. At completion of the input/output (I/O) routine resulting in the data page containing the update being flushed, the flushed data page's PID can be added in the flushed page array. A first write LSN (FW-LSN) can be captured in the DC log 114 that can correspond with the last reported (by the TC) end of the stable portion of the TC log 112 (i.e., the portion of the TC log 112 prior to the RSSP) at the time of the FW-LSN being written. This is done at the time that the first page is flushed (written) in a delta interval.

In addition, when the next modification to the data page or any other data page after the FW-LSN occurs, a PID and/or index page entry for this recently updated data page can be written to the dirtied page array. Thus, the first dirtied data page after the first flush of a delta record interval can be captured. This PID and/or index page entry for the first dirtied data page can be referred to as FirstDirty information.

An individual delta record can thus contain information that includes the currently stored dirtied page array (sorted in the order in which the pages were updated), flushed page array, FW-LSN, and FirstDirty information. In this regard PIDs of the currently stored dirtied page array can be referred to as the DirtySet, while the PIDs of the currently stored flushed page array can be referred to as the WrittenSet.

In addition to the above, an individual delta record can also contain information that includes an LSN for the most recently sent logical operation (as of the time the individual delta record was written in the DC log 114) that was written by the TC 104 in the TC log 112. This recent LSN can be referred to as the TC-LSN. Thus:

Delta ($\Delta$) record=(DirtySet, WrittenSet, FW-LSN, FirstDirty, TC-LSN).

In some embodiments, the writing of a delta record can reset the dirtied page array and the flushed page array, so that monitoring by the DC 106 can start from scratch for each new interval. Furthermore, recall that only information for data pages updated after the RSSP need be maintained in the dirtied and flushed page arrays. Therefore, delta records containing information from these arrays about data pages updated before the penultimate checkpoint can be purged from the DC log 114.

DPT Construction in Enhanced Logical Recovery

As noted above, the DC recovery can take place before the TC redo pass, to make sure that the B-tree is well-formed and to permit the DC 106 to enhance TC logical redo recovery (during the TC redo pass) by constructing the DPT 116.

With respect to constructing the DPT 116, recall that only delta records that include information for data pages updated after the RSSP need be maintained in the DC log 114. In some embodiments, for each such delta record delta record in the DC log 114 encountered during the DC redo, all PIDs in the delta record's DirtySet can be added as entries to the DPT 116. Individual DPT entries for PIDs that were dirtied (updated) before the first write of that delta record can be assigned an rLSN equal to the TC-LSN of the delta record immediately preceding that delta record.

Furthermore, other individual DPT entries for PIDs that were dirtied after the first write of that delta record can be assigned an rLSN equal to the FW-LSN of that delta record because they were updated after FW-LSN occurred on the TC log 112.

In some embodiments, the individual DPT entries can also be assigned an LastLSN. The LastLSN of each DPT entry can approximate the oLSN of the last operation whose effects on the data page corresponding to that DPT entry's PID were captured stably.

Once the DPT 116 is initially constructed, the WrittenSet can be used to prune the DPT 116. More particularly, the DC 106 can remove DPT entries (i.e., prune DPT entries) for PIDs corresponding to data pages last updated before the FW-LSN of the current delta record. These prunable DPT entries were either added from a previous delta record (and were consequently dirtied before the FW-LSN), or they were dirtied in the current interval—but before the FirstWrite of the current delta record. Each of these DPT entries to be pruned will likely have an LastLSN less than the FW-LSN of the current delta record.

One example of DPT construction in an enhanced logical recovery approach is illustrated in the algorithm below entitled ALGORITHM 2: DPT CONSTRUCTION IN LOGICAL RECOVERY:

---

ALGORITHM 2: DPT CONSTRUCTION IN LOGICAL RECOVERY

```
 1: procedure DC-ANALYSIS-PASS(ckptLSN)
 2:    DPT = null
 3:    prevΔLSN = ckptLSN
 4:    for ∀ Δ-logRec with Δ-logRec.TC-LSN > ckptLSN do
 5:       DC-DPT-UPDATE(Δ-logRec, prevΔLSN)
 6:       prevΔLSN = Δ-logRec.TC-LSN
 7:
 8: procedure DC-DPT-UPDATE(Δ-logRec, prevΔLSN)
 9:
10:    for i = 0 to |Δ-logRec.DirtySet| - 1 do
11:       if i < Δ-logRec.FirstDirty then
12:          DPT.ADDENTRY(pid(i), prevΔLSN)
13:       else
14:          DPT.ADDENTRY(pid(i), Δ-logRec.FW-LSN)
15:
16:    for ∀ pid in Δ-logRec.WrittenSet do
17:       e = DPT.FINDENTRY(pid)
18:       if e ≠ null then
19:          if e.lastLSN < Δ-logRec.FW-LSN then
20:             DPT.REMOVEENTRY(pid)
21:          else if e.rLSN < Δ-logRec.FW-LSN then
22:             e.rLSN = Δ-logRec.FW-LSN
```

---

Logical Redo Using the DPT in Enhanced Logical Recovery

Once the DC recovery operations (including the construction of the DPT 116) have been performed, the TC redo pass can begin. More particularly, the TC 104 can send redo operations to the DC 106. As explained above, for each redo operation a corresponding oLSN for the redo operation, and record key for a logical record to be updated by the redo operation, can also be submitted to the DC 106. The record key can be used by the DC 106 to traverse the B-tree of the database(s) 110 to identify the PID of a data page corresponding to the logical record.

For example, consider a received redo operation, an oLSN for the redo operation, and a record key associated with the redo operation. The DC 106 can use the record key to search a B-tree of the database(s) 110 to discover the PID of the data page corresponding to the record key. The DC 106 can accomplish this without having to fetch any data page information into the DC's cache.

Once the PID is discovered, the DC 106 can compare the oLSN of the received redo operation to the TC-LSN of the most recent (last) delta record written in the DC log 114. Based on this comparison, the DC 106 can then proceed in one of two possible modes.

More particularly, when the oLSN is less than or equal to the TC-LSN of the last delta record, the DC 106 can proceed in a pruning mode by performing pruning operations on the received redo operation. However, when the oLSN is greater than this TC-LSN, the DC 106 can proceed in a non-pruning mode in which the data page corresponding to the record key is fetched into the DC's cache in order to determine whether the redo operation's effects have been stably captured (e.g., by comparing the data page's pLSN to the oLSN).

As described above in detail, the pruning operations can include determining whether or not the data page's PID is listed in the DPT 116. If the DPT 116 does not list the PID, or if the DPT 116 lists the PID but the PID's assigned rLSN in the DPT 116 is greater than the oLSN, the received redo operation can be pruned. As a result, the data page does not need to be fetched into the DC's cache in order to determine whether the redo operation's effects have been stably captured.

Accordingly, unlike the non-enhanced recovery approach, the DC 106 can utilize the constructed DPT 116 during the TC redo pass to prune at least some received redo operations. As a result, each data page of every received redo operation does not need to be fetched during the TC redo pass. Thus, the resources necessary to complete the TC redo pass can be mitigated.

Note that PIDs of data pages updated after the current delta record may not be contained, or captured, in the DPT 116. This is because these PIDs may not be available to the DC 106 during the DC recovery operations. Therefore, received redo operations that correspond to the data pages updated after the last delta record written to the DC log 114 may not be able to be pruned using the DPT 116.

Nevertheless, PIDs for these data pages can be available in the DC cache, or another cache associated with the DC log 114, at the time of the recovery-initiating event. Therefore, individual data pages can still be fetched during the TC redo pass, when the corresponding redo operations are received, in order to determine whether or not individual corresponding redo operations should be repeated.

Furthermore, since the PIDs for these data pages can be available in the DC's cache, or another cache of the DC log 114, the resources necessary to fetch these data pages can still be mitigated. More particularly, the resources can still be mitigated by pre-fetching the data pages and/or corresponding index pages into DC's cache during the DC recovery operations.

One example of logical redo operations using the DPT 116 in an enhanced logical recovery approach is illustrated in the algorithm below entitled ALGORITHM 3: DPT-ASSISTED LOGICAL REDO:

---

Algorithm 3: DPT-ASSISTED LOGICAL REDO

```
 1: procedure TC-LOGICAL-REDO-PASS(startLSN)
 2:   for ∀ logRec with logRec.LSN ≥ startLSN do
 3:     DC-LOGICAL-REDO-OPERATION(logRec)
 4:
 5: function DC-Logical-Redo-Operation (logRec)
 6:   currLSN=logRec.LSN
 7:   Traverse the index to find the PID referred to by the logRec
 8:   if currLSN < lastΔ.TC–LSN then
 9:     Find the entry e of PID in the DPT
10:     if e = null ∨ currLSN < e.rLSN then
11:       return
12:     Bring the page p with PID into memory
13:     if currLSN ≤ p.pLSN then
14:       return
15:     else
16:       Redo the operation
```

---

Pre-Fetching in Enhanced Logical Recovery.

Recall that in some embodiments, the resources associated with fetching data pages associated with non-pruned redo operations can be mitigated. For example, in some embodiments the DC 106 can be configured to pre-fetch data pages, and/or index pages associated with these data pages, before corresponding redo operations are received from the TC 104 during the TC redo pass. Therefore, the index and/or data pages may already be available in the DC's cache—and stalls associated with TC logical redo operations can be reduced or even avoided altogether.

Furthermore, by requesting the index and/or data pages in a batch, a cache manager can group contiguous index and/or data pages and read them in a block, thus exploiting locality of access. Consider, for instance, Microsoft's SQL SERVER™ in which blocks of eight contiguous pages can be read with a single I/O routine. Thus, index and/or data page pre-fetching can both reduce the number of stalls and the total number of I/Os during the TC redo pass.

Index Page Pre-Fetching— in an unbundled system (e.g. DBMS) such as system 100, operations and redo operations sent from the TC 104 to the DC 106 do not include data page information (e.g. PIDs). Thus, the DC 106 may need to traverse one or more B-trees of the database(s) 110 in order to discover which data pages are associated with these transactions. For example, consider a received operation, record key for a logical record, and oLSN for the operation. The operation may be associated with modifying a data page associated with the logical record. To discover the data page, the DC 106 can traverse/search a B-tree by accessing one or more index pages using the record key to eventually discover the data page.

Typically, needed index pages may be fetched into the DC's cache as needed (i.e., upon demand). In this regard, for a particular operation, a corresponding B-tree's root may be fetched immediately, and then a path to a corresponding data page may be loaded. Subsequent operations may result in the fetching of additional paths and missing parts of paths. Over time, subsequent operations will likely be associated with most index and/or data pages that are already in the DC cache. However, while various index pages are initially being fetched into the DC's cache, TC redo operations performed by the DC 106 will likely proceed very slowly while various index pages are fetched.

Various index page pre-fetching approaches can be thus used to reduce the wait time associated with fetching index pages during the TC redo pass. For example, in some embodiments, index page DC log records can be written that contain index page PIDs. The index page DC log records can be used to pre-fetch index pages during the TC redo pass.

Alternatively or additionally, some or all index pages of the B-tree(s) of the database(s) 110 can be pre-fetched into the DC's cache and/or during (e.g. at or near the beginning of) the DC recovery so that they are available in the DC's cache during the TC redo pass. This may be beneficial since the number of index pages may be relatively small as compared to the number of data pages associated with redo operations received during the TC redo pass.

Data Page Pre-Fetching— pre-fetching data pages may have a significant impact on performance during the TC redo pass. Typically, during a recovery process, the number of data pages that need to be fetched may be considerably greater than the number of DC record or index pages. Therefore, the DC 106 can pre-fetch data pages according to a log-driven strategy and/or a DPT-driven strategy.

With respect to the log-driven strategy, in some embodiments a pre-fetch list can be constructed using the DC log 114 (e.g., a DirtySet of a delta record) during the DC recovery operations (e.g., during system analysis operations). In this regard, the pre-fetch list can list individual PIDs from the dirtied page array that are not already listed in the DPT 116. Data pages corresponding to the PIDs in the pre-fetch list can be pre-loaded into the DC's cache rather than waiting to load the data pages' corresponding received redo operations when the redo operations are not pruned.

With respect to the DPT-driven strategy, in some embodiments individual data pages corresponding to PIDs in the DPT 116 can be pre-fetched into the DC's cache in an order based on the PIDs' respective rLSNs. Note that this strategy does not depend on the DC log 114. Rather, data page pre-fetching can proceed independently.

Example Operating Environment

Figure 2:
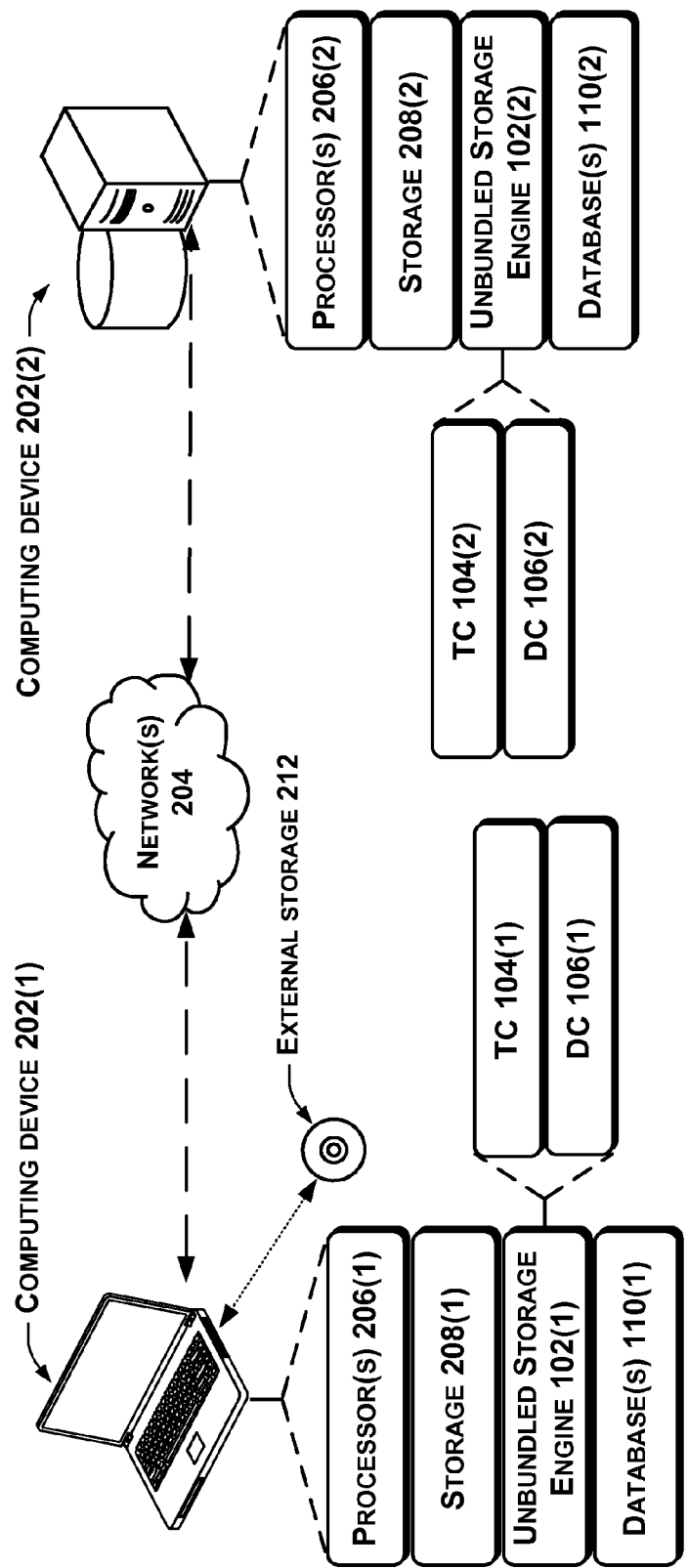
FIG. 2 illustrates an example operating environment, in accordance with some embodiments.

FIG. 2 illustrates an example system, or operating environment 200 in which the described enhanced logical recovery techniques may be implemented, in accordance with some embodiments. For purposes of discussion, the operating environment 200 is described in the context of the system 100. Like numerals from FIG. 1 have thus been utilized to depict like components. However, it is to be appreciated and understood that this is but one example and is not to be interpreted as limiting the system 100 to only being implemented in the operating environment 200.

In this example, the operating environment 200 includes first and second computing devices 202(1) and 202(2). These computing devices, can function in a stand-alone or cooperative manner to implement enhanced logical recovery. Furthermore, in this example, the computing devices 202(1) and 202(2) can exchange data over one or more networks 204. Without limitation, network(s) 204 can include one or more local area networks (LANs), wide area networks (WANs), the Internet, and the like.

Here, each of the computing devices 202(1) and 202(2) can include a processor(s) 206 and storage 208. In addition, either or both of these computing devices can implement all or part of the database(s) 110 and/or the unbundled storage engine 102—including without limitation the TC 104, and/or the DC 106.

The processor(s) 206 can execute data in the form of computer-readable instructions to provide the functionality described herein. Data, such as computer-readable instructions can be stored on the storage 208. The storage can include one or more of volatile or non-volatile memory, hard drives, optical storage devices (e.g., CDs, DVDs etc.), among others.

The devices 202(1) and 202(2) can also be configured to receive and/or generate data in the form of computer-readable instructions from an external storage 212. Examples of external storage can include optical storage devices (e.g., CDs, DVDs etc.) and flash storage devices (e.g., memory sticks or memory cards), among others. The computing devices may also receive data in the form of computer-readable instructions over the network(s) 204 that is then stored on the computing device for execution by its processor(s).

In some embodiments, all or part of database(s) 110 can be implemented on the storage 208 and/or the external storage 212. Alternatively or additionally, in some embodiments all or part of database(s) 110 is implemented on storage other than storage 208 and/or the external storage 212.

As mentioned above, either of the computing devices 202(1) and 202(2) may function in a stand-alone configuration. For example, the database(s) 110 and/or the unbundled storage engine 102 might be implemented on the computing device 202(1) (and/or external storage 212). In such a case, functionality associated with the unbundled storage engine 102 (e.g. the TC 104 and the DC 106) might be used to implement the described enhanced logical recovery embodiments without communicating with the network 204 and/or the computing device 202(2).

In another scenario, one or both portions of the unbundled storage engine (e.g., the TC 104) might be implemented on the computing device 202(1) while one or more other portions of the unbundled storage engine 102 (e.g., the DC 106) might be implemented on the computing device 202(2). In such a case, communication between the computing devices might allow a user of the computing device 202(1) to achieve the described enhanced logical recovery.

In still another scenario the computing device 202(1) might be a thin computing device with limited storage and/or processing resources. In such a case, processing, data storage, and/or computing-related functionality associated with implementing the described techniques could occur on the computing device 202(2). Alternatively or additionally, the processing, data storage, and/or other computing-related functionality could occur upon a cloud of any number of known and/or unknown distributed computing devices connected via the network(s) 204). Results of the processing can then be sent to and displayed upon the computing device 202(1) for the user.

The term "computing device" as used herein can mean any type of device that has some amount of processing capability. Examples of computing devices can include traditional computing devices, such as personal computers, cell phones, smart phones, personal digital assistants, or any of a myriad of ever-evolving or yet to be developed types of computing devices.

Example Unbundled Architecture

Figure 3:
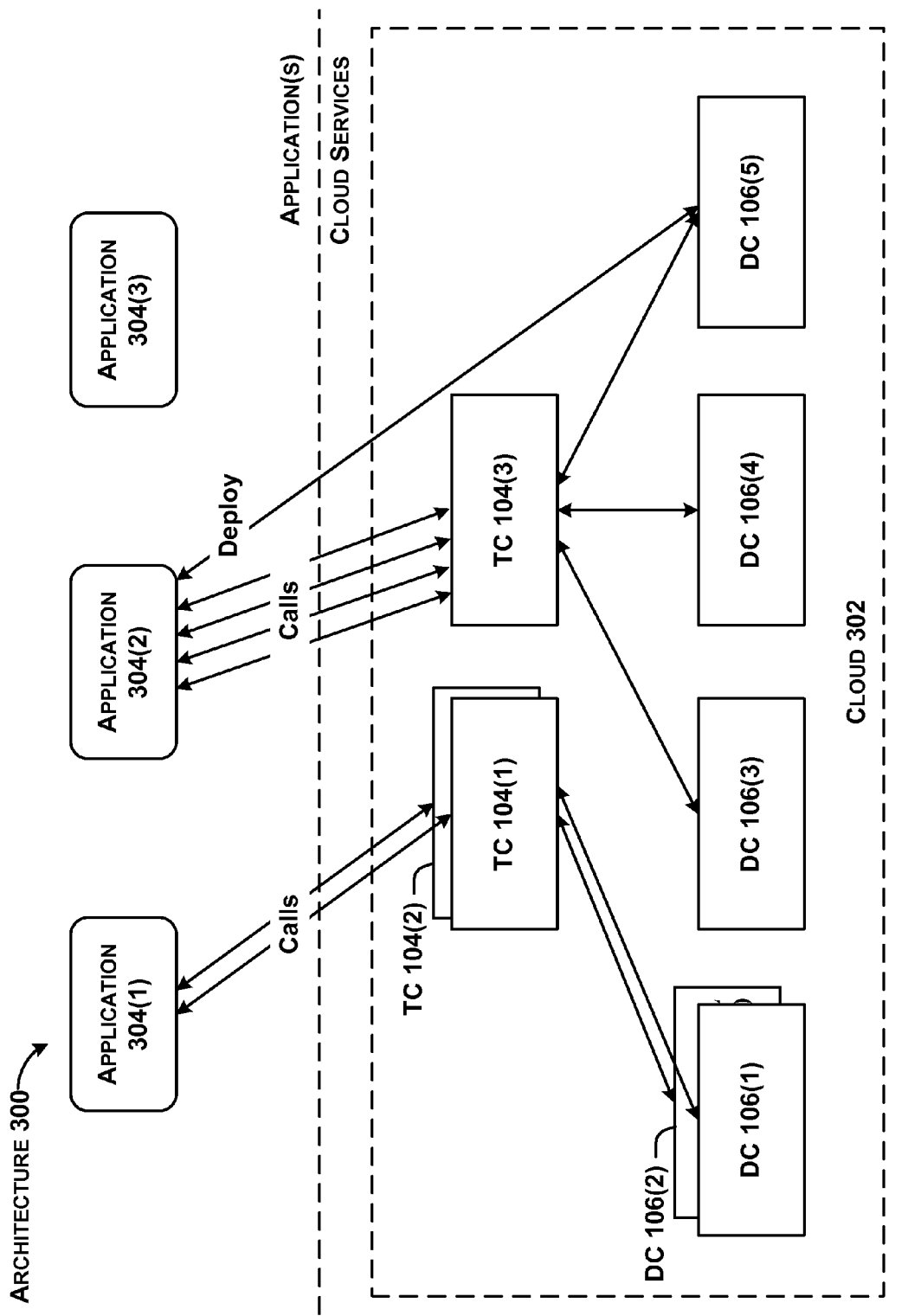
FIG. 3 illustrates an example unbundled architecture, in accordance with some embodiments.

FIG. 3 illustrates an example unbundled architecture 300 that may be implemented in an operating environment, such as the operating environment 200 for example. For purposes of discussion, the example unbundled architecture 300 is thus described in the context of the operating environment 200 and the system 100. Like numerals from FIGS. 1 and 2 have thus been utilized to depict like components. However, it is to be appreciated and understood that this is but one example and is not to be interpreted as limiting the unbundled architecture 300 to only being implemented in the operating environment 200 and/or system 100.

Recall that processing, data storage, and/or computing-related functionality associated with implementing the described techniques may be implemented on a cloud of any number of known and/or unknown distributed computing devices. As such, any number of instances of the TC 104 and/or DC 106 may be implemented in the cloud. Therefore, for purposes of illustration, in this example multiple instances of the TC 104 and DC 106 are shown as being implemented on a cloud 302 associated with available distributed cloud services (e.g., Web services). More particularly, here TC instances TC 104(1), TC 104(2), and TC 104(3) are shown as being implemented on the cloud 302. Each of these TC instances may be associated with providing some or all of the TC functionality described above. Similarly, DC instances DC 106(1), DC 106(2), DC 106(3), DC 106 (4), and DC 106(5) are shown as being implemented on the cloud 302. Each of the DC instances may be associated with some or all of the DC functionality provided above.

Continuing, any number of applications may be executed in the context of the unbundled architecture 300. Therefore, for purposes of illustration, in this example applications 304 (1), 304(2), and 304(3) are illustrated as being executed. As will be appreciated by those skilled in the art, one or more of these applications may be configured to make and/or receive calls to and/or from the cloud 302 to utilize the cloud services. In addition, one or more of these applications may be configured to be able to cause one or more deployments of a DC and/or TC instance as needed.

In some embodiments, one or more of applications 304(1), 304(2), or 304(3) may be configured to take advantage of a fast and easy deployment on a care-free platform, such as provided by the unbundled architecture 300. For example, without limitation, these application(s) might include a social-community forum (e.g., for sharing photos, videos, reviews, ratings, etc.), Internet-based long-running game with many players, or an information mashup that composes value-added portals from blogs, news, and other Internet sources. Cloud services available via the cloud 302 may thus provide a convenient solution for the application(s).

By providing an unbundled storage engine that includes TC instances (TC 104(1)-TC 104(3)) that are architecturally independent of DC instances (DC 106(1)-106(5)), these components may be instantiated in a variety of ways. As but one example, when the DC instances are associated with longer execution paths than the TC instances, a comparatively larger number of DC instances than TC instances might be deployed to enhance load balancing.

Exemplary Methods

Figure 4:
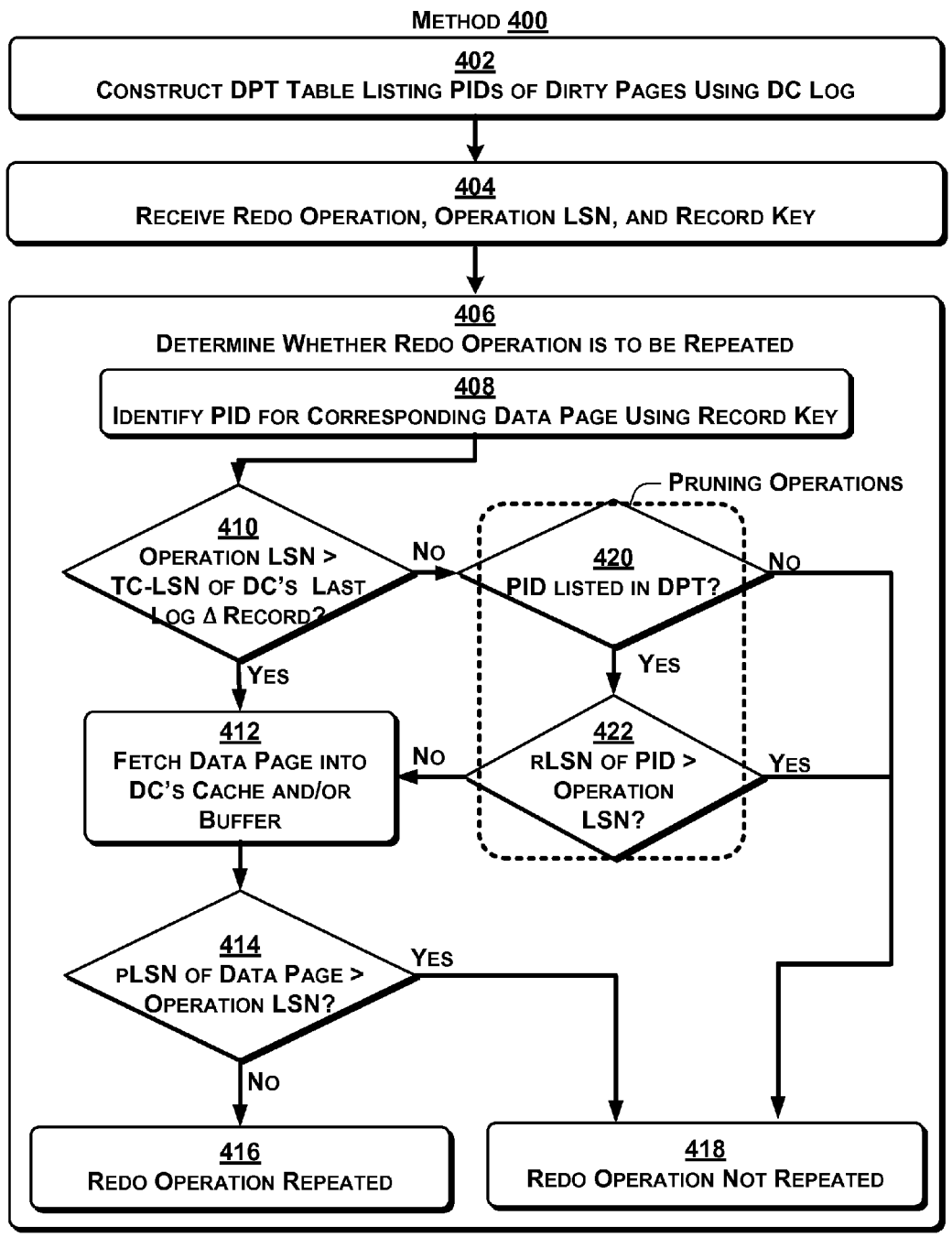
FIGS. 4 and 5 illustrate example methods, in accordance with some embodiments.
Figure 5:
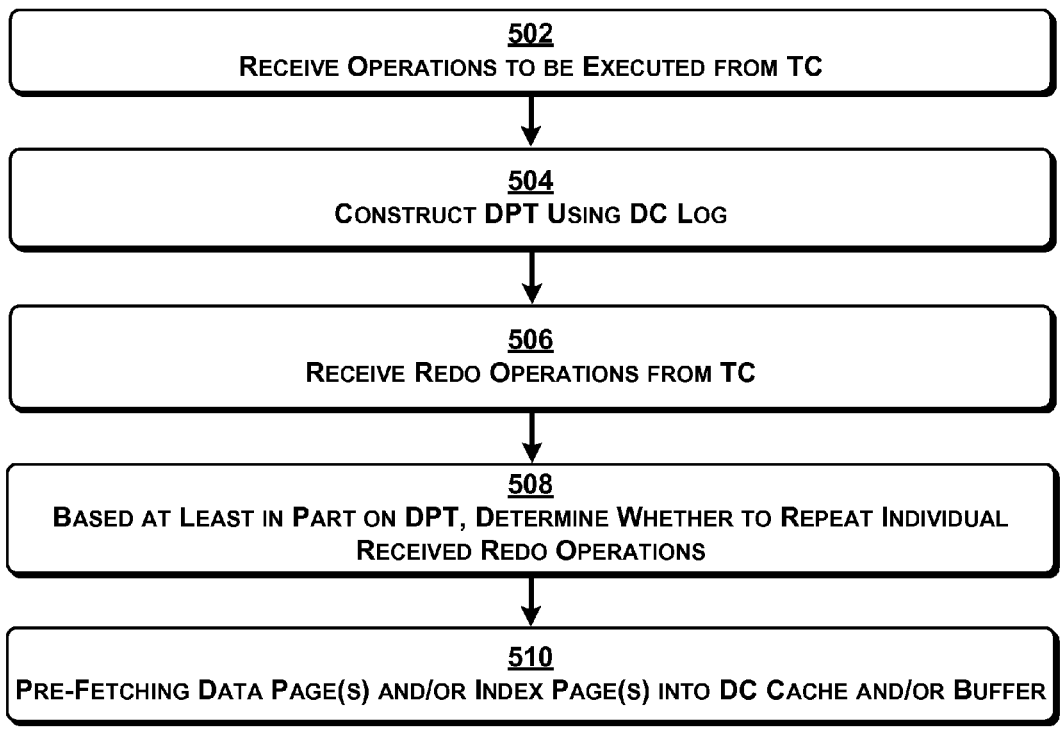

FIGS. 4 and 5 illustrate flowcharts of processes, techniques, or methods, generally denoted as a method 400 and method 500 respectively, that are consistent with some implementations of the described enhanced logical recovery techniques.

For purposes of discussion, the methods 400 and 500 are described in the context of the system 100. Like numerals from FIG. 1 have thus been utilized to depict like components. However, it is to be appreciated and understood that this is but one example and is not to be interpreted as limiting these methods to being implemented in the system 100.

Furthermore, the orders in which the methods 400 and 500 are described are not intended to be construed as a limitation, and any number of the described blocks can be combined in any order to implement the method, or an alternate method. Further still, each of these methods can be implemented in any suitable hardware, software, firmware, or combination thereof such that a computing device can implement the method. In some embodiments, one or both of these methods are stored on a computer-readable storage media as a set of instructions such that, when executed by a computing device(s), cause the computing device(s) to perform the method(s).

Regarding the method 400 illustrated in FIG. 4, at block 402 the DPT 116 can be built using the DC log 114. Recall that the DPT 116 can be constructed by the DC 106 in response to a recovery-initiating event, such as a crash of the system 100 for example. In this regard, as part of the system 100's normal non-recovery operations, the DC 106 can receive logical transactions (and TC log information) from the TC 104. The DC 106 can then execute operations associated with the received logical transactions and monitor information about data pages made dirty and data pages made clean in the DC log 114.

Furthermore, recall that in accordance with the described enhanced logical recovery techniques, the DC 106 can perform DC recovery operations of the redo pass before the TC logical redo operations of a TC redo pass are performed. As explained above, these DC recovery operations can include DC redo operations and undo operations. By virtue of the redo and undo operations of the DC recovery being performed before the TC logical redo operations, the B-tree index pages and data pages of the database(s) 110 can be used to build a well-formed B-tree. As a result, the TC logical redo operations can be performed accurately.

As also explained above, the DC recovery operations can also include DC analysis operations that may include the construction of the DPT 116. In this regard, in some embodiments a DPT construction algorithm such as ALGORITHM 2: DPT CONSTRUCTION IN LOGICAL RECOVERY DESCRIBED ABOVE may be utilized to construct the DPT 116. By virtue of the DC analysis operations being performed before the TC logical redo operations, the DPT 116 can be available during the TC redo pass to allow at least some received redo operations to be pruned.

Accordingly, at block 404 a redo operation can be received from the TC 104. As explained above, a corresponding oLSN for the redo operation and a record key for a logical record to be updated by the redo operation can also be received with the redo operation. The redo operation can be one of the operations that were previously received from the TC 104 and possibly previously executed by the DC 106 as part of the system's normal non-recovery operations.

At block 406, a determination can be made whether or not the received redo operation is to be repeated. As explained above, unlike with basic ARIES-like recovery operations, the described enhanced logical recovery techniques can be utilized to perform redo operation pruning on using the constructed DPT 116. In this regard, in some embodiments, an algorithm similar to ALGORITHM 3: DPT-ASSISTED LOGICAL REDO described above can be utilized to make this determination.

As a result of implementing the enhanced logical recovery techniques, at least some received redo operations may be pruned such that every data page associated with every received redo operation does not need to be fetched (during the TC redo pass) in order to determine whether or not each redo operation is to be repeated. Accordingly, the determination at block 406 includes pruning operation blocks, which will be described in further detail below.

Continuing, at block 408 a PID for a data page corresponding to the redo operation can be identified by using the received record key. As explained above in detail, this can be accomplished without fetching the data page into the DC's cache.

At block 410 the oLSN can be compared to the TC-LSN of the last delta (Δ) record of the DC log 114 to determine whether or not the oLSN is greater than (>) the TC-LSN. When the oLSN is not greater than the TC-LSN (No), the DC 106 can perform one or both of the pruning operations when determining whether or not the redo operation is to be repeated. These pruning operations, which are illustrated by blocks 420 and 422, will be described in further detail below.

When the oLSN is greater than the TC-LSN (Yes), the DC 106 can proceed without performing the pruning operations.

More particularly, at block 412 the data page can be fetched into the DC's cache. Then, at block 414, the pLSN of the data page can be compared to the oLSN to determine whether or not the pLSN is greater than the oLSN. When, at block 414, the pLSN is not greater than the oLSN (No), the effects of the redo operation have not been stably captured and the page is thus dirty. In this case, at block 416 the redo operation is repeated by the DC 106 as part of the TC redo operations.

However, when at block 414 the pLSN is greater than the oLSN (Yes), the effects of the redo operation have been stably captured and the data page is clean. Thus, in this case at block 418 the redo operation is not repeated as part of the TC redo operations.

Continuing, recall that when the oLSN is not greater than the TC-LSN (No) at block 410, DC 106 can perform one or both of the pruning operations. More particularly, at block 420 the DC 106 can perform a first pruning operation by accessing the DPT 116 and determining whether or not the identified PID is listed in the DPT 116.

When, at block 420, the PID is not listed in the DPT 116 (No), the data page is clean and thus the effects of the redo operation on the data page have been stably captured. In this case, the redo operation does not need to be repeated and at block 418 the redo operation is thus not repeated. Hence, the DC 106 does not need to fetch the data page into the DC's cache to determine whether or not the data page was actually clean. As a result, the redo operation has thus effectively been filtered out, or pruned. In other words, the expenditure of resources that might otherwise be consumed to perform the operations at blocks 412 and 414 can be avoided.

However, at block 420 when the PID is listed in the DPT 116 (Yes), the data page may be dirty and thus, the effects of the redo operation on the data page may have not have been stably captured. As such, in this case the redo operation cannot be effectively pruned at block 420—since it is unclear whether or not the data page is actually clean or dirty.

Nevertheless, at block 420 when the PID is listed in the DPT 116, the DC 106 can perform a second pruning operation at block 422 by comparing the rLSN of the PID to the oLSN to determine whether or not the rLSN is greater than (>) the oLSN. When the PID's rLSN is greater than the oLSN (Yes), the effects of another operation that was executed after the redo operation was originally executed have been stably captured. Therefore, the effects of the redo operation on the data page have also already been stably captured. Thus, in this case at block 418 the redo operation is not repeated.

However, when at block 422 the PID's rLSN is not greater than the oLSN (No), the data page may be dirty and thus the effects of the redo operation on the data page may not have been stably captured. Therefore, in this case (No), the redo operation cannot be effectively pruned at block 422 since it is unclear whether or not the data page is actually clean or dirty. Accordingly, the operations at blocks 412, 414, and 416 or 418 can be performed as described above.

Regarding method 500 illustrated in FIG. 5, at block 502 operations to be executed by the DC 106 can be received from the TC 104. Recall that these operations can be received and executed by the DC 106 as part of the system 100's normal non-recovery related operations.

At block 504, the DPT 116 can be constructed using the DC log 114. As explained above, the DC 106 can maintain the DC log 114 (e.g., as part of the normal non-recovery operations) and construct the DPT 116 in response to a recovery-initiating event as part of the DC recovery operations. In this regard, the DC 106 can utilize information from the DC log 114 to construct the DPT 116.

At block 506, redo operations can be received from the TC 104. Recall that for each received redo operation, a corresponding oLSN and a record key can also be received. Each of the redo operations may have been previously executed by the DC 106 (e.g., by the DC 106). As such, one or more of the redo operations may correspond with one or more of the operations received at block 502 for instance. Also recall that the redo operations can be sent from the TC 104 to the DC 106 during a TC redo pass after the DC recovery operations have been performed.

At block 508, based at least in part on the constructed DPT 116, a determination can be made whether individual received redo operations are to be repeated. As explained above in detail, to accomplish this, the DC 106 can perform at least one of the above-mentioned pruning operations to effectively filter out, or prune, one or more of the received redo operations. This can be accomplished without having to fetch any data pages corresponding to the pruned received redo operation(s). The data pages corresponding to the pruned received redo operation(s) may be data pages on which the effects, or state change, produced by the redo operation(s) into the cache have been written to disk, or recorded. In other words, the data page(s) to be updated by the pruned received redo operation(s) does not need to be fetched into the DC's cache in order to determine whether or not that data page(s) is actually clean or dirty.

At block 510, one or more data pages and/or one or more index pages corresponding to the received redo operations can be pre-fetched into the DC's cache, as described in detail above. In this regard, note that pre-fetched data pages may correspond to received redo operations that are not pruned at block 508. Similarly, pre-fetched index pages may be correspond to the received redo operations, whether pruned or not at block 508.

CONCLUSION

Although techniques, methods, devices, systems, etc., pertaining to enhanced logical recovery techniques are described in language specific to structural features and/or methodological acts, it is to be understood that the subject matter defined in the appended claims is not necessarily limited to the specific features or acts described. Rather, the specific features and acts are disclosed as exemplary forms for implementing the claimed methods, devices, systems, etc.

The invention claimed is:

1. One or more computer-readable volatile or non-volatile memory devices, hard drives, or optical storage devices having instructions stored thereon that, when executed, cause at least one hardware processor to perform acts comprising:
receiving, from a transaction component (TC) of a storage engine, operations to be executed on stored data by a data component (DC) of the storage engine that is architecturally independent of the TC;
maintaining, by the TC, a TC log comprising a start point usable to initiate recovery;
maintaining, by the DC, a DC log comprising information associated with execution of the operations, the maintaining comprising:
periodically saving delta records in the DC log, individual delta records comprising data page data associated with the stored data and a first write log sequence number (FW-LSN) that corresponds with a portion of the TC log prior to the start point, the data page data comprising dirtied data page data and cleaned data page data, each pair of two consecutively saved delta records defining a corresponding delta interval; and purging at least one of the delta records from the DC log, the at least one purged delta record having corresponding data page data for at least one corresponding data page updated before the start point;

in response to a recovery-initiating event:

constructing a dirty page table (DPT) utilizing one or more of the delta records based on the DC log, the constructing comprising:

utilizing the dirtied data page data to add DPT entries; and utilizing the cleaned data page data to remove at least one of the added DPT entries;

receiving redo operations and corresponding record keys from the TC, wherein individual received redo operations comprise individual received operations that have been executed by the DC before the recovery initiating event; and based on the constructed DPT, determining that at least one received redo operation of the received redo operations is not to be re-executed, wherein the determining is performed without fetching an individual data page of a database on which a state change produced by the at least one received redo operation into a cache is recorded, and wherein the determining comprises:

identifying a page identifier (PID) for the individual data page by using a received record key corresponding to the at least one received redo operation to search one or more index pages associated with the individual data page; and determining whether the PID is listed in the DPT.

2. The one or more computer-readable volatile or non-volatile memory devices, hard drives, or optical storage devices of claim 1, the acts further comprising:

pre-fetching, into the cache, the individual data page or one or more other data pages of the stored data that are associated with the received redo operations.

3. The one or more computer-readable volatile or non-volatile memory devices, hard drives, or optical storage devices of claim 1, the acts further comprising:

pre-fetching the one or more index pages into the cache.

4. The one or more computer-readable volatile or non-volatile memory devices, hard drives, or optical storage devices of claim 1, wherein at least part of the DC log is maintained by the DC prior to the recovery-initiating event.

5. The one or more computer-readable volatile or non-volatile memory devices, hard drives, or optical storage devices of claim 1, wherein a portion of the information includes individual PIDs for individual dirtied data pages of the database dirtied during the interval and individual flushed data pages cleaned during the interval.

6. The one or more computer-readable volatile or non-volatile memory devices, hard drives, or optical storage devices of claim 5, wherein the constructing further comprises:

listing one or more of the individual PIDs in the DPT; and assigning each listed individual PID a corresponding recovery log sequence number (LSN).

7. The one or more computer-readable volatile or non-volatile memory devices, hard drives, or optical storage devices of claim 1, wherein determining that the at least one received redo operation is not to be re-executed further comprises:

determining that the PID is not listed in the DPT; or determining that the PID is listed in the DPT and that the PID has a corresponding recovery log sequence number (LSN) that is greater than an operation LSN for the at least one received redo operation.

8. The one or more computer-readable volatile or non-volatile memory devices, hard drives, or optical storage devices of claim 1, wherein the storage engine and the database comprise at least part of a database management system.

9. A system comprising:

a transaction component (TC);

a data component (DC); and at least one hardware processor configured to execute the TC and the DC, wherein the DC is configured to:

periodically save delta records in a DC log, individual delta records comprising data page data associated with stored data and a first write log sequence number (FW-LSN) that corresponds with a portion of a TC log prior to a start point on the TC log, the data page data comprising dirtied data page data and cleaned data page data, each pair of two consecutively saved delta records defining a corresponding delta interval;

purge at least one of the delta records from the DC log, the at least one purged delta record having corresponding data page data for one or more corresponding data pages updated before the start point;

responsive to a recovery-initiating event, utilize the DC log to construct a dirty page table (DPT) listing updated data pages that have been updated by operations received by the DC, the DC configured to construct the DPT by utilizing the dirtied data page data to add DPT entries and by utilizing the cleaned data page data to remove at least one of the added DPT entries;

receive a redo operation that has been executed by the DC; and determine whether the redo operation is to be re-executed based at least in part on the constructed DPT by:

utilizing a record key to identify at least one page identifier (PID) for an individual data page corresponding to the redo operation; and determining whether the PID is listed in the DPT; and wherein the TC is architecturally independent of the DC and the TC is configured to maintain the TC log and to send the redo operation and the record key to the DC.

10. The system of claim 9, wherein the TC is configured to send the redo operation to the DC after the DPT is constructed.

11. The system of claim 9, wherein the TC is further configured to at least one of:

send the redo operation to the DC before the recovery-initiating event;

periodically write checkpoints to the TC log to establish the start point; or send the redo operation and one or more other individual redo operations on the TC log later than the start point, in sequence, to the DC, wherein the redo operation and the one or more other individual redo operations correspond to individual logical operations written to the TC log since a time associated with the start point.

12. The system of claim 9, wherein, to determine whether the redo operation is to be re-executed, the DC is further configured to determine that the redo operation is not to be re-executed without loading the individual data page or any other data pages corresponding to the redo operation into a cache.

13. A method performed by at least one computing device, the method comprising:
- periodically saving, by a data component (DC), delta records in a DC log, individual delta records comprising data page data associated with stored data and a first write log sequence number (FW-LSN), wherein a transaction component (TC) maintains a TC log and the FW-LSN corresponds with a portion of the transaction component (TC) log prior to a start point on the TC log, the data page data comprising dirtied data page data and cleaned data page data, each pair of two consecutively saved delta records defining a corresponding delta interval;
- purging at least one of the delta records from the DC log, the at least one purged delta record having corresponding data page data for one or more corresponding data pages updated before the start point;
- receiving, from the TC, a plurality of operations to be executed by the DC;
- constructing, by the DC, a dirty page table (DPT) in response to a recovery-initiating event, the constructing comprising:
  - utilizing the dirtied data page data to add DPT entries; and
  - utilizing the cleaned data page data to remove at least one of the added DPT entries;
- receiving, from the TC, at least one operation of the plurality of operations, wherein the at least one operation has been executed by the DC;
- receiving an operation log sequence number (oLSN) for the at least one operation and a record key for a logical record to be updated by the at least one operation; and
- determining, by the DC, whether to re-execute the at least one operation based on the DPT, wherein the determining comprises:
  - using the record key to identify a page identifier (PID) for an individual data page to be updated by the at least one operation; and
  - determining whether the PID is listed in the DPT.

14. The method of claim 13, wherein determining whether to re-execute the at least one operation further comprises:
- comparing the oLSN to a TC log sequence number (TC-LSN) written by the TC in the TC log, wherein the TC-LSN corresponds to at least one other operation of the plurality of operations.

15. The method of claim 14, wherein determining whether to reexecute the at least one operation further comprises:
- when the oLSN is greater than a last TC-LSN, utilizing the PID to load the individual data page into a cache of the DC and to compare the oLSN with a page LSN (pLSN) of the individual data page;
- determining to re-execute the at least one operation when the oLSN is greater than the pLSN; and
- determining to not re-execute the at least one operation when the oLSN is not greater than the pLSN.

16. The method of claim 14, wherein determining whether to reexecute the at least one operation further comprises:
- when the oLSN is not greater than the TC-LSN, determining whether the PID is listed in the DPT;
- determining to not re-execute the at least one operation when the PID is not listed in the DPT; and
- comparing a recovery LSN (rLSN) with the oLSN when the PID is listed in the DPT, wherein the rLSN corresponds to the PID and is listed in the DPT.

17. The method of claim 16, wherein determining whether to reexecute the at least one operation further comprises:
- determining to not re-execute the at least one operation when the rLSN is greater than the oLSN;
- when the rLSN is not greater than the oLSN, utilizing the PID to load the individual data page into a cache of the DC and to compare the oLSN with a pLSN of the individual data page;
- determining to re-execute the at least one operation when the oLSN is greater than the pLSN; and
- determining to not re-execute the at least one operation when the oLSN is not greater than the pLSN.

18. The method of claim 13, wherein the cleaned page data indicates corresponding cleaned pages have been written to disk.

19. The method of claim 13, wherein the recovery-initiating event is a system crash.

20. The method of claim 13, further comprising maintaining the TC log with the TC and identifying the plurality of operations in the TC log based on the start point.

* * * * *